(12) United States Patent
Suzuki et al.

(10) Patent No.: US 11,317,399 B2
(45) Date of Patent: *Apr. 26, 2022

(54) WIRELESS COMMUNICATION METHOD, BASE STATION, TRANSMISSION/RECEPTION POINT, USER EQUIPMENT AND WIRELESS COMMUNICATION SYSTEM

(71) Applicant: Sun Patent Trust, New York, NY (US)

(72) Inventors: Hidetoshi Suzuki, Kanagawa (JP); Alexander Golitschek Edler Von Elbwart, Darmstadt (DE); Masayuki Hoshino, Kanagawa (JP); Lilei Wang, Beijing (CN)

(73) Assignee: Sun Patent Trust, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/035,340

(22) Filed: Sep. 28, 2020

(65) Prior Publication Data

US 2021/0029680 A1 Jan. 28, 2021

Related U.S. Application Data

(63) Continuation of application No. 14/908,077, filed as application No. PCT/CN2013/080352 on Jul. 29, 2013, now Pat. No. 10,827,472.

(51) Int. Cl.
*H04W 72/04* (2009.01)
*H04L 5/00* (2006.01)
*H04L 5/14* (2006.01)

(52) U.S. Cl.
CPC ......... *H04W 72/042* (2013.01); *H04L 5/0035* (2013.01); *H04L 5/0053* (2013.01);
(Continued)

(58) Field of Classification Search
CPC combination set(s) only.
See application file for complete search history.

(56) References Cited

U.S. PATENT DOCUMENTS 8,750,107 B2    6/2014   Iwamura et al.
10,827,472 B2 * 11/2020   Suzuki ................. H04L 5/0053
(Continued)

FOREIGN PATENT DOCUMENTS

CN    102711252 A    10/2012
JP    2011-41163 A    2/2011
(Continued)

OTHER PUBLICATIONS

European Communication pursuant to Rule 164(1) EPC, dated Jun. 28, 2016, for corresponding EP Application No. 13890538.5-1851 /3028515, 10 pages.
(Continued)

*Primary Examiner* — Mandish K Randhawa
(74) *Attorney, Agent, or Firm* — Seed IP Law Group LLP

(57) ABSTRACT

The present disclosure provides a wireless communication method, a transmission/reception point, a user equipment and a wireless communication system, the wireless communication method comprising a step of: receiving the UL/DL configuration for the UE in a common search space of a specific time/frequency resource associated with a specific TP/RP, wherein, the UE is attached to the specific TP/RP, and the association between a number index of the specific TP/RP and an index of the specific time/frequency resource is predefined.

10 Claims, 9 Drawing Sheets

(52) U.S. Cl.
CPC .......... *H04L 5/0073* (2013.01); *H04L 5/1469* (2013.01); *H04W 72/0446* (2013.01)

(56) References Cited

U.S. PATENT DOCUMENTS

| | | | |
|---|---|---|---|
| 2012/0182869 | A1 | 7/2012 | Iwamura et al. |
| 2012/0281646 | A1 | 11/2012 | Liao et al. |
| 2012/0320806 | A1 | 12/2012 | Ji et al. |
| 2013/0034028 | A1 | 2/2013 | Chen et al. |
| 2013/0188516 | A1 | 7/2013 | He et al. |
| 2014/0177556 | A1 | 6/2014 | Pan et al. |
| 2014/0348039 | A1 | 11/2014 | Park et al. |
| 2015/0003301 | A1 | 1/2015 | He et al. |
| 2015/0341958 | A1 | 11/2015 | Guo et al. |
| 2016/0143007 | A1 | 5/2016 | Xu et al. |

FOREIGN PATENT DOCUMENTS

| | | |
|---|---|---|
| WO | 2012/062154 A1 | 5/2012 |
| WO | 2012/155690 A1 | 11/2012 |
| WO | 2013/081377 A1 | 6/2013 |
| WO | 2014/210212 A1 | 12/2014 |

OTHER PUBLICATIONS

Extended European Search Report, dated Jul. 7, 2017, for corresponding European Application No. 17174824.7-1875, 9 pages.
Extended European Search Report, dated Sep. 6, 2016, for corresponding EP Application No. 13890538.5-1851 / 3028515, 17 pages.
Intel Corporation, "Discussion on reconfiguration signaling mechnisms for TDD UL-DL reconfiguration," R1-131921, 3GPP TSG-RAN WG1 #73, Agenda item: 6.2.3.2, Fukuoka, Japan, May 20-24, 2013, 6 pages.
International Search Report, dated May 9, 2014, for International Application No. PCT/CN2013/080352, 2 pages.
LG Electronics, "Signaling Mechanisms for TDD eIMTA," R1-132231, 3GPP TSG RAN WG1 Meeting #73, Agenda Item: 6.2.3.2, Fukuoka, Japan, May 20-24, 2013, 5 pages.
Nokia Siemens Networks, Nokia, "On signalling mechanisms to support dynamic TDD UL-DL reconfiguration," R1-132297, 3GPP TSG-RAN WG1 Meeting #73, Agenda Item: 6.2.3.2, Fukuoka, Japan, May 20-24, 2013, 4 pages.
Panasonic, "Signalling mechanisms for TDD UL-DL reconfiguration," R1-130321, 3GPP TSG RAN WG1 Meeting #72, Agenda Item: 7.3.3.3, St. Julian's, Malta, Jan. 28-Feb. 1, 2013, 3 pages.
Panasonic, "Signalling mechanisms for TDD UL-DL reconfiguration," R1-131326, 3GPP TSG RAN WG1 Meeting #72bis, Agenda Item: 7.2.3.2, Chicago, USA, Apr. 15-19, 2013, 3 pages.
Qualcomm Europe, "PDCCH format for Paging," R1-081480, 3GPP TSG-RAN WG1 #52bis, Agenda item: 6.1.3, Shenzhen, China, Mar. 31-Apr. 4, 2008, 3 pages.
Renesas Mobile Europe Ltd., Backwards compatibility in TDD eIMTA, R1-132170, 3GPP TSG RAN WG1 Meeting #73, Agenda Item: 6.2.3.3, Fukuoka, Japan, May 20-24, 2013, 3 pages.
Renesas Mobile Europe Ltd, "Further Discussion on Signaling Schemes for TDD eIMTA," R1-132168, 3GPP TSG RAN WG1 Meeting #73, Agenda Item: 6.2.3.2, Fukuoka, Japan, May 20-24, 2013, 5 pages.
ZTE, "Subframe configuration of monitoring ePDCCH," R1-124203, 3GPP TSG-RAN WG1 Meeting #70bis, Agenda Item: 7.5.4, San Diego, USA, Oct. 8-12, 2012, 3 pages.

\* cited by examiner

WIRELESS COMMUNICATION METHOD, BASE STATION, TRANSMISSION/RECEPTION POINT, USER EQUIPMENT AND WIRELESS COMMUNICATION SYSTEM

TECHNICAL FIELD

The present disclosure relates to the communication field, and in particular, to a wireless communication method, a base station, a transmission/reception point, a user equipment and a wireless communication system.

BACKGROUND ART eIMTA (Further Enhancements to Long Term Evolution (LTE) Time Division Duplexing (TDD) for Downlink-Uplink (DL-UL) Interference Management and Traffic Adaptation) is one work item (WI) topic in 3GPP LTE Rel.12 and targeted to adapt traffic by modifying TDD UL/DL configuration. One of the main focuses is to enable fast TDD UL/DL configuration to realize traffic adaptation. Currently the TDD UL/DL configuration information is carried in System Information Block 1 (SIB1) and the variation period is 640 ms. One of the discussion points is how to transmit TDD UL/DL configuration information in physical layer (L1).

So far, there are generally four options about the fast TDD UL/DL configuration signaling transmission: (1) implicit signaling; (2) explicit L1 signaling of reconfiguration by common search space (CSS); (3) explicit L1 signaling by user equipment specific Physical Downlink Control Channel (UE-specific PDCCH); and (4) explicit MAC signaling. Among them, Option 2) is most promising from signaling overhead, and is supported almost by most companies.

One problem of option (2) is how different transmission point/reception points (TP/RPs) distinguish their own TDD UL/DL configuration transmitted in CSS in Coordinated Multi-point (CoMP) scenario, especially CoMP scenario 4.

In particular, FIG. 1 is a diagram schematically showing "CoMP scenario 4" 100 in LTE, wherein a macro point (also referred to as the macro base station, the base station hereinafter) 101 and three TP/RPs comprising the pico points 102, 103 and 104 share the same common signal/channels. That is, UEs in the macro point 101 (e.g., UE 106) and UEs in the pico points 102-104 (e.g., UE 105 in the pico point 104) share the same UL/DL configuration transmitted in the same CSS. For different TP/RPs, for example, TP/RPs 102, 103 and 104, they cannot have different TDD UL/DL configuration to adapt to their own uplink/downlink traffic, respectively. All TP/RPs have to share the same TDD UL/DL configuration.

SUMMARY OF THE DISCLOSURE

The present disclosure is made in consideration of the above aspects.

According to a first aspect of the present disclosure, a wireless communication method of receiving uplink/downlink (UL/DL) configuration by a user equipment (UE), in a wireless communication system including multiple transmission/reception points (TP/RPs), comprising a step of: receiving the UL/DL configuration for the UE in a common search space of a specific time/frequency resource associated with a specific TP/RP, wherein, the UE is attached to the specific TP/RP, and the association between a number index of the specific TP/RP and an index of the specific time/frequency resource is predefined.

According to a second aspect of the present disclosure, a wireless communication method of transmitting uplink/downlink (UL/DL) configuration by a base station, in a wireless communication system including multiple transmission/reception points (TP/RPs), comprising a step of: transmitting UL/DL configuration to a user equipment (UE) attached to a specific TP/RP, in a common search space of a specific time/frequency resource associated with the specific TP/RP; wherein, the association between a number index of the specific TP/RP and an index of the specific time/frequency resource is predefined.

According to a third aspect of the present disclosure, a wireless communication method of receiving uplink/downlink (UL/DL) configuration by a user equipment (UE), in a wireless communication system including multiple transmission/reception points (TP/RPs), comprising a step of: receiving the UL/DL configuration for the UE from a specific TP/RP, in a UE specific search space of a specific time/frequency resource associated with the specific TP/RP, wherein, the UE is attached to the specific TP/RP, and the association between a number index of the specific TP/RP and an index of the specific time/frequency resource is predefined.

According to a fourth aspect of the present disclosure, a wireless communication method of transmitting uplink/downlink (UL/DL) configuration by a transmission/reception point (TP/RP), in a wireless communication system including multiple TP/RPs, comprising a step of: transmitting UL/DL configuration to a user equipment (UE) attached to the TP/RP, in a UE specific search space of a specific time/frequency resource associated with the TP/RP; wherein, the association between a number index of the TP/RP and an index of the specific time/frequency resource is predefined.

According to a fifth aspect of the present disclosure, a wireless communication method of receiving uplink/downlink (UL/DL) configuration by a user equipment (UE), in a wireless communication system including multiple transmission/reception points (TP/RPs), comprising a step of: receiving the UL/DL configuration for the UE in a UE group common search space of a common search space of a specific time/frequency resource associated with a specific UE group, wherein, the UE is grouped into the specific UE group, and the association between a number index of the specific UE group and an index of the specific time/frequency resource is predefined.

According to a sixth aspect of the present disclosure, a wireless communication method of transmitting uplink/downlink (UL/DL) configuration by a base station, in a wireless communication system including multiple transmission/reception points (TP/RPs), comprising a step of: transmitting the UL/DL configuration to a user equipment (UE), in a UE group common search space of a common search space of a specific time/frequency resource associated with a specific UE group; wherein, the UE is grouped into the specific UE group, and the association between a number index of the specific UE group and an index of the specific time/frequency resource is predefined.

According to a seventh aspect of the present disclosure, a wireless communication method of receiving uplink/downlink (UL/DL) configuration by a user equipment (UE), in a wireless communication system including multiple transmission/reception points (TP/RPs), comprising a step of: receiving the UL/DL configuration for the UE from a TP/RP to which it is attached, in a UE group common search space of a UE specific search space of a specific time/frequency resource associated with a specific UE group, wherein, the UE is grouped into the specific UE group, and the association between a number index of the specific UE group and an index of the specific time/frequency resource is predefined.

According to an eighth aspect of the present disclosure, a wireless communication method of transmitting uplink/downlink (UL/DL) configuration by a transmission/reception point (TP/RP), in a wireless communication system including multiple TP/RPs, comprising a step of: transmitting the UL/DL configuration to a user equipment (UE) attached to the TP/RP, in a UE group common search space of a UE specific search space of a specific time/frequency resource associated with a specific UE group; wherein, the UE is grouped into the specific UE group, and the association between a number index of the specific UE group and an index of the specific time/frequency resource is predefined.

According to a ninth aspect of the present disclosure, a user equipment (UE) of receiving uplink/downlink (UL/DL) configuration in a wireless communication system including multiple transmission/reception points (TP/RPs), comprising: a receiver which receives the UL/DL configuration for the UE in a common search space of a specific time/frequency resource associated with a specific TP/RP, wherein, the UE is attached to the specific TP/RP, and the association between a number index of the specific TP/RP and an index of the specific time/frequency resource is predefined.

According to a tenth aspect of the present disclosure, a base station of transmitting uplink/downlink (UL/DL) configuration, in a wireless communication system including multiple TP/RPs, comprising: a transmitter which transmits the UL/DL configuration to a user equipment (UE), in a common search space of a specific time/frequency resource associated with a specific TP/RP; wherein, the UE is attached to the specific TP/RP, and the association between a number index of the specific TP/RP and an index of the specific time/frequency resource is predefined.

According to an eleventh aspect of the present disclosure, a user equipment (UE) of receiving uplink/downlink (UL/DL) configuration in a wireless communication system including multiple transmission/reception points (TP/RPs), comprising: a receiver which receives the UL/DL configuration for the UE from a specific TP/RP, in a UE specific search space of a specific time/frequency resource associated with the specific TP/RP, wherein, the UE is attached to the specific TP/RP, and the association between a number index of the specific TP/RP and an index of the specific time/frequency resource is predefined.

According to a twelfth aspect of the present disclosure, a transmission/reception point (TP/RP) of transmitting uplink/downlink (UL/DL) configuration, in a wireless communication system including multiple TP/RPs, comprising: a transmitter which transmits UL/DL configuration to a user equipment (UE) attached to the TP/RP, in a UE specific search space of a specific time/frequency resource associated with the TP/RP; wherein, the association between a number index of the TP/RP and an index of the specific time/frequency resource is predefined.

According to a thirteenth aspect of the present disclosure, a user equipment (UE) of receiving uplink/downlink (UL/DL) configuration, in a wireless communication system including multiple transmission/reception points (TP/RPs), comprising: a receiver which receives the UL/DL configuration for the UE in a UE group common search space of a common search space of a specific time/frequency resource associated with a specific UE group, wherein, the UE is grouped into the specific UE group, and the association between a number index of the specific UE group and an index of the specific time/frequency resource is predefined.

According to a fourteenth aspect of the present disclosure, a base station of transmitting uplink/downlink (UL/DL) configuration, in a wireless communication system including multiple transmission/reception points (TP/RPs), comprising: a transmitter which transmits the UL/DL configuration to a user equipment (UE), in a UE group common search space of a common search space of a specific time/frequency resource associated with a specific UE group; wherein, the UE is grouped into the specific UE group, and the association between a number index of the specific UE group and an index of the specific time/frequency resource is predefined.

According to a fifteenth aspect of the present disclosure, a user equipment (UE) of receiving uplink/downlink (UL/DL) configuration, in a wireless communication system including multiple transmission/reception points (TP/RPs), comprising: a receiver which receives the UL/DL configuration for the UE from a TP/RP to which it is attached, in a UE group common search space of a UE specific search space of a specific time/frequency resource associated with a specific UE group, wherein, the UE is grouped into the specific UE group, and the association between a number index of the specific UE group and an index of the specific time/frequency resource is predefined.

According to an sixteenth aspect of the present disclosure, a transmission/reception point (TP/RP) of transmitting uplink/downlink (UL/DL) configuration, in a wireless communication system including multiple TP/RPs, comprising: a transmitter which transmits the UL/DL configuration to a user equipment (UE) attached to the TP/RP, in a UE group common search space of a UE specific search space of a specific time/frequency resource associated with a specific UE group; wherein, the UE is grouped into the specific UE group, and the association between a number index of the specific UE group and an index of the specific time/frequency resource is predefined.

According to a seventeenth aspect of the present disclosure, a wireless communication system, comprising: a first transmission/reception point (TP/RP), which transmits a first uplink/downlink (UL/DL) configuration to user equipments (UEs) in its coverage in a common search space of a first time/frequency resource associated with the first TP/RP; a second TP/RP, which transmits a second UL/DL configuration to UEs in its coverage in a common search space of a second time/frequency resource associated with the second TP/RP; a base station which transmits the first uplink/downlink UL/DL configuration to UEs in its coverage in the common search space of the first time/frequency resource, and transmits the second UL/DL configuration to UEs in its coverage in the common search space of the second time/frequency resource; a first UE attached to the first TP/RP, which receives the first UL/DL configuration in the common search space of the first time/frequency resource; and a second UE attached to the second TP/RP, which receives the second UL/DL configuration in the common search space of the second time/frequency resource; wherein, the association between a number index of TP/RP and an index of time/frequency resource is predefined at the base station, the first TP/RP, the second TP/RP, the first UE and the second UE.

According to an eighteenth aspect of the present disclosure, a wireless communication system, comprising: a base station; a first transmission/reception point (TP/RP) which transmits a first uplink/downlink (UL/DL) configuration to user equipments (UEs) in its coverage, in a UE specific common search space of a first time/frequency resource; a second TP/RP which transmits a second UL/DL configuration to UEs in its coverage, in a UE specific common search space of a second time/frequency resource; a first UE attached to the first TP/RP, which receives the first UL/DL configuration from the first TP/RP, in the UE specific common search space of the first time/frequency resource; and a second UE attached to the second TP/RP, which receives the second UL/DL configuration from the second TP/RP, in the UE specific common search space of the second time/frequency resource; wherein, the association between a number index of TP/RP and an index of time/frequency resource is predefined at the first TP/RP, the second TP/RP, the first UE and the second UE.

According to a nineteenth aspect of the present disclosure, a wireless communication system, comprising: a first transmission/reception point (TP/RP), which transmits a first UL/DL configuration to user equipments (UEs) in its coverage, in a UE group common search space of a common search space of a first time/frequency resource associated with a first UE group; a second TP/RP, which transmits a second UL/DL configuration to UEs in its coverage, in a UE group common search space of a common search space of a second time/frequency resource associated with a second UE group; a base station which transmits the first UL/DL configuration to UEs in its coverage in the UE group common search space of the common search space of the first time/frequency resource, and transmits a second UL/DL configuration to UEs in its coverage in the UE common group search space of the common search space of the second time/frequency resource; a first UE in the first UE group, which receives the first UL/DL configuration, in the UE group common search space of the common search space of the first time/frequency resource; and a second UE in the second UE group, which receives the second UL/DL configuration, in the UE group common search space of the common search space of the second time/frequency resource; wherein, the association between a number index of UE group and an index of time/frequency resource is predefined at the base station, the first TP/RP, the second TP/RP, the first UE and the second UE.

According to a twentieth aspect of the present disclosure, a wireless communication system, comprising: a base station; a first transmission/reception point (TP/RP), which transmits a first UL/DL configuration to user equipments (UEs) in its coverage, in a UE group common search space of a UE specific search space of a first time/frequency resource associated with a first UE group; a second TP/RP which transmits a second UL/DL configuration to UEs in its coverage, in a UE group common search space of a UE specific search space of a second time/frequency resource associated with a second UE group; a first UE in the first UE group, which receives the first UL/DL configuration from the first TP/RP, in the UE group common search space of the UE specific search space of the first time/frequency resource; and a second UE in the second UE group, which receives the second UL/DL configuration from the second TP/RP, in the UE group common search space of the UE specific search space of the second time/frequency resource; wherein, the association between a number index of UE group and an index of time/frequency resource is predefined at the first TP/RP, the second TP/RP, the first UE and the second UE.

According to the wireless communication method, the base station, the transmission/reception point, the user equipment and the wireless communication system of some aspects of the present disclosure, different TP/RPs may have their own TDD UL/DL configuration to adapt to their own uplink/downlink traffic even when the different TP/RPs share the same common search space.

In addition, according to the wireless communication method, the base station, the transmission/reception point, the user equipment and the wireless communication system of some aspects of the present disclosure, different TP/RPs may have their own TDD UL/DL configuration to adapt to their own uplink/downlink traffic by transmitting the TDD UL/DL configuration in a UE-specific search space. Moreover, the false detection and the interference with other TP/RPs may be reduced even for a UE at the edge of a certain TP/RP or in the overlapped area of multiple TP/RPs.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and/or other aspects and advantages of the present disclosure will become more distinct and easier to be understood in a detailed description of embodiments of the present disclosure below in combination with attached drawings, in which.

DESCRIPTION OF THE EMBODIMENTS

Figure 1:
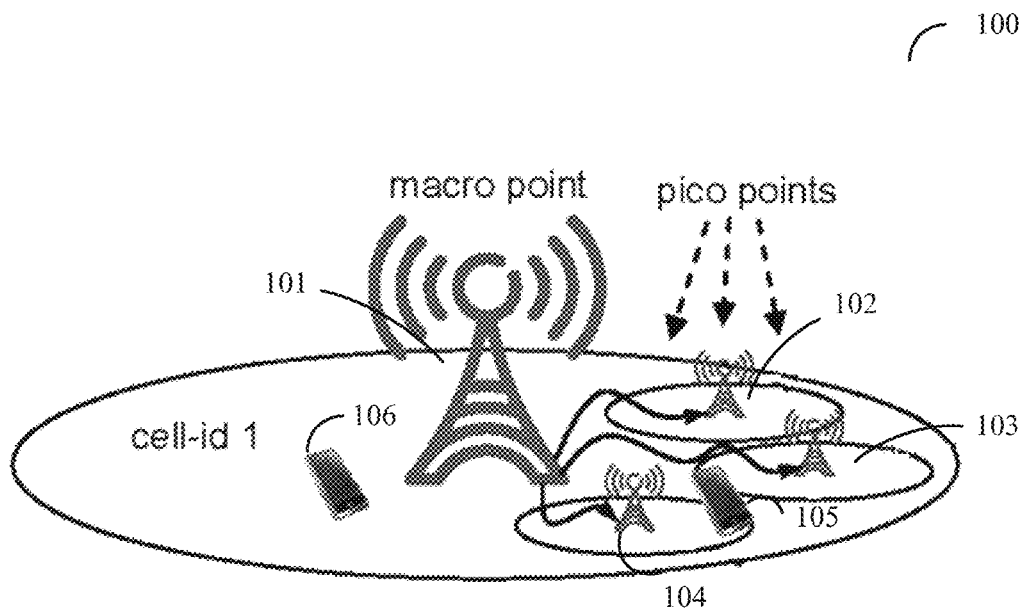
FIG. 1 is a diagram schematically showing CoMP scenario 4 in LTE.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

Figure 2:
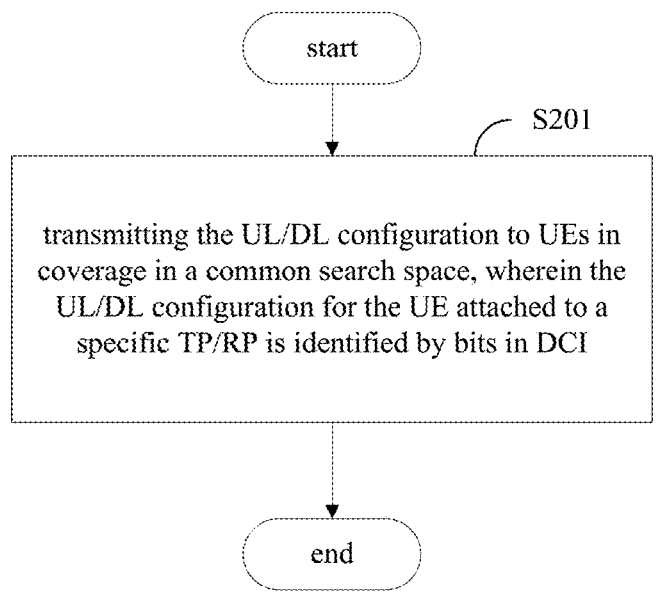
FIG. 2 is a flowchart showing a wireless communication method by a transmission/reception point according to a first embodiment of the present disclosure.
Figure 3:
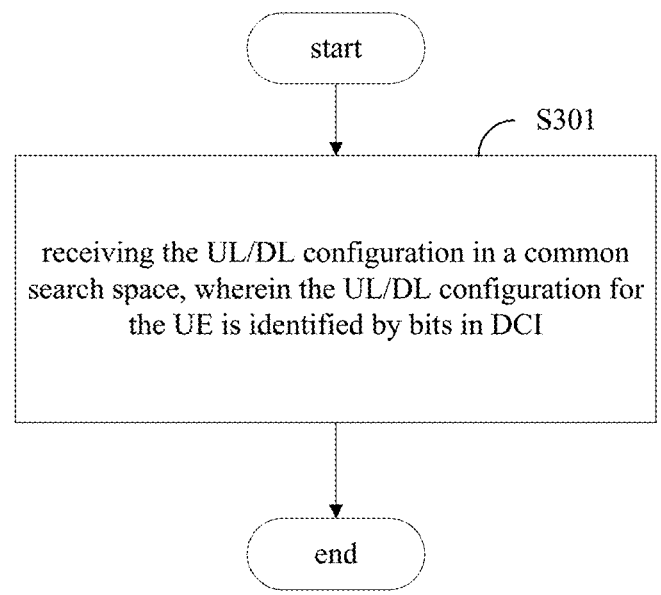
FIG. 3 is a flowchart showing a wireless communication method by a user equipment according to the first embodiment of the present disclosure.

FIG. 2 is a diagram showing a wireless communication method by a base station according to an implementation of the first embodiment. FIG. 3 is a diagram showing a wireless communication method by a user equipment (UE) according to another implementation of the first embodiment.

In the first embodiment, at the (macro) base station side, a wireless communication method of transmitting uplink/downlink (UL/DL) configuration by a base station in a common search space of a wireless communication system is provided. As shown in FIG. 2, the method comprises a step 201 of: transmitting the UL/DL configuration to UEs in coverage in a common search space, wherein the UL/DL configuration for the UE attached to a specific TP/RP is identified by bits in Downlink Control Information (DCI).

It is to be noted that although FIG. 2 illustrates the wireless communication method by the (macro) base station, since the macro base station and different TP/RPs share the CSS to transmit (broadcast) the UL/DL configuration, the wireless communication method by a TP/RP is similarly carried out. That is, a TP/RP transmits the UL/DL configuration to UEs in coverage in a common search space, wherein the UL/DL configuration for the UE attached to the TP/RP is identified by bits in DCI.

At the UE side, a wireless communication method of receiving UL/DL configuration by a UE in a common search space of a wireless communication system is provided. As shown in FIG. 3, the method comprises a step 301 of: receiving the UL/DL configuration in a common search space, wherein the UL/DL configuration for the UE is identified by bits in DCI.

Accordingly, a TP/RP of transmitting UL/DL configuration in a wireless communication system is provided, comprising: a transmitter which transmits the UL/DL configuration to UEs in the coverage in a common search space, wherein the UL/DL configuration for the UE attached to the TP/RP is identified by bits in DCI.

Also, a (macro) base station of transmitting UL/DL configuration in a wireless communication system is provided, comprising: a transmitter which transmits the UL/DL configuration to UEs in the coverage in a common search space, wherein the UL/DL configuration for the UE attached to a specific TP/RP is identified by bits in DCI.

Also, a UE of receiving UL/DL configuration in a common search space of a wireless communication system is provided, comprising: a receiver which receives the UL/DL configuration in a common search space, wherein the UL/DL configuration for the UE is identified by bits in DCI.

Also, a wireless communication system is provided, comprising: a base station, which transmits the UL/DL configuration to UEs in coverage in a common search space; a TP/RP, which transmits the UL/DL configuration to UEs in coverage in the common search space; and a UE attached to the TP/RP, which receives the UL/DL configuration in the common search space, wherein the UL/DL configuration is identified by bits in DCI.

In particular, in the first embodiment, the wireless communication method is applied in a wireless communication system including multiple TP/RPs. The (macro) base station and the multiple TP/RPs share the same CSS to transmit the UL/DL configuration for all the TP/RPs.

Therefore, to identify the UL/DL configuration for each TP/RP so that different TP/RPs may have their own UL/DL configuration, an identifier formed of bits in Downlink Control Information (DCI) may be used.

For example, some additional bits are added directly to the DCI for identifying the UL/DL configuration. Alternatively, some fields in DCI may be reused for such identification. The number of added or reused bits is associated with the number of TP/RPs. In particular, the added or reused bits are sufficient to identify each UL/DL configuration possibility for all of the TP/RPs.

For example, currently there are 7 TDD UL/DL configuration possibilities in LTE, which are shown in the following Table 1.

TABLE 1

Uplink-Downlink Configuration in LTE

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Wherein, "D" refers to a downlink subframe, "U" refers to an uplink subframe, and "S" refers to a special subframe.

Assuming there are three TP/RPs, the identifier needs to identify 7^3=343 UL/DL configuration possibilities. Therefore, at least 9 bits are needed. With the increase of the TP/RPs, the number of bits increases. For example, assuming there are ten TP/RPs, the identifier needs to identify 7^10=282475249 UL/DL configuration possibilities, which means at least 29 bits.

According to the first embodiment of the present disclosure, each TP/RP may have its own UL/DL configuration indicated by the identifier in DCI, even when the different TP/RPs share the same common search space.

However, in the first embodiment, it needs some modification to DCI, which means a relatively large impact on the specification. Further, as described above, the identifier may need a large number of bits, if the number of TP/RPs is large. Therefore, it needs a great effort on the DCI design in the first embodiment.

In addition, there is no splitting gain in the first embodiment. If there is error in some bits, it would result in a wrong identification for all the TP/RPs, and thus the system performance will be affected largely.

To further decrease the standardization efforts and increase the splitting gain, a third embodiment of the present disclosure is provided, which will be described later.

Second Embodiment

Figure 4:
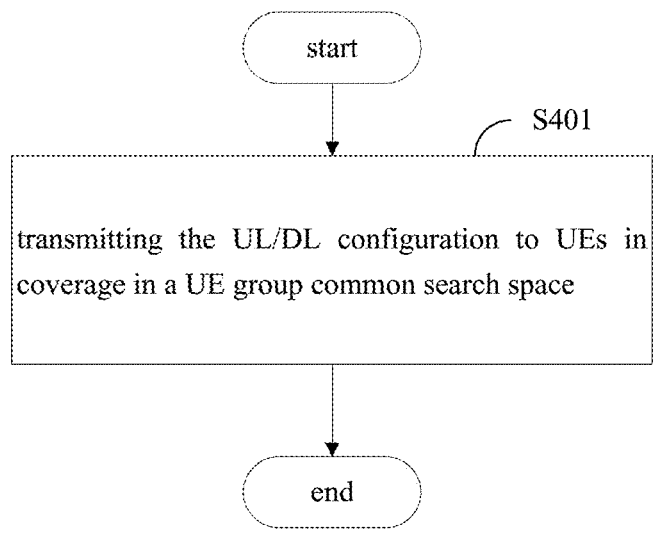
FIG. 4 is a flowchart showing a wireless communication method by a transmission/reception point according to a second embodiment of the present disclosure.
Figure 5:
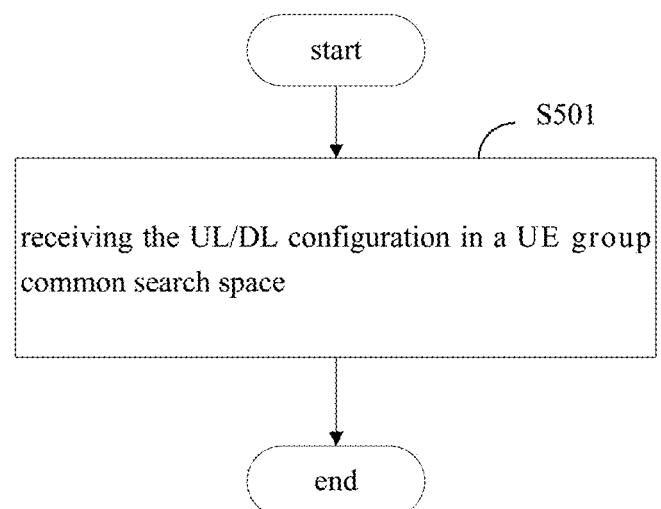
FIG. 5 is a flowchart showing a wireless communication method by a user equipment according to the second embodiment of the present disclosure.

FIG. 4 is a diagram showing a wireless communication method by a base station according to an implementation of the second embodiment. FIG. 5 is a diagram showing a wireless communication method by a user equipment (UE) according to another implementation of the second embodiment.

In the second embodiment, at the (macro) base station or the TP/RP side, as shown in FIG. 4, the method comprises a step 401 of: transmitting the UL/DL configuration to UEs in the coverage in a UE group common search space (UE-group CSS). Accordingly, at the UE side, as shown in FIG. 5, the method comprises a step 501 of: receiving the UL/DL configuration in a UE group common search space.

In particular, in this embodiment, UEs in the wireless communication system are grouped, for example, based on the different TP/RPs to which they are attached. That is, UEs in a certain group may be attached to the same TP/RP, or attached to different TP/RPs. It is to be noted that, when UEs in a certain group are attached to the same TP/RP, the UE-group CSS potentially means the TP/RP-specific CSS.

Further, UEs in the same group share the same (e)PDCCH. Therefore, Compared to the CSS which is common to all UEs in the wireless communication system in the first embodiment, the UE-group CSS means a search space common to a certain UE group out of all UEs, so that UEs in a certain UE group may have the same TP/RP configuration. The UE-group CSS may be defined in the common search space or the UE-specific search space.

According to the second embodiment of the present disclosure, assuming UEs in a group are attached to the same TP/RP, then a certain TP/RP transmits its own UL/DL configuration in a UE-group CSS specific to this TP/RP. Accordingly, UEs attached to this TP/RP may receive their UL/DL configuration in the same UE-group CSS. Thereby, each TP/RP may have its own UL/DL configuration to adapt to its own uplink/downlink traffic.

However, in the second embodiment, different UL/DL configuration may still be transmitted in a UE-group CSS of the same subframe. Therefore, UEs, especially those in the overlapped area of the coverage of different TP/RPs, may receive different UL/DL configuration in the same subframe, which may result in some false detections.

To further reduce the false detections and improve the splitting gain, a fourth embodiment of the present disclosure is provided, which will be described later.

Third Embodiment

Figure 6:
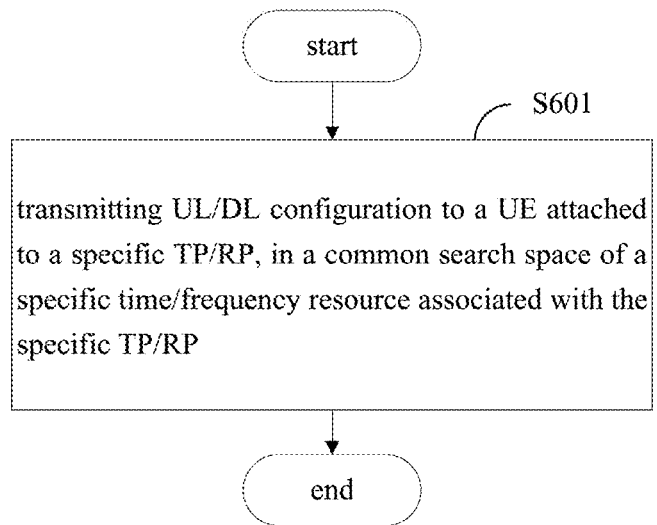
FIG. 6 is a flowchart showing a wireless communication method by a transmission/reception point according to a third embodiment of the present disclosure.
Figure 7:
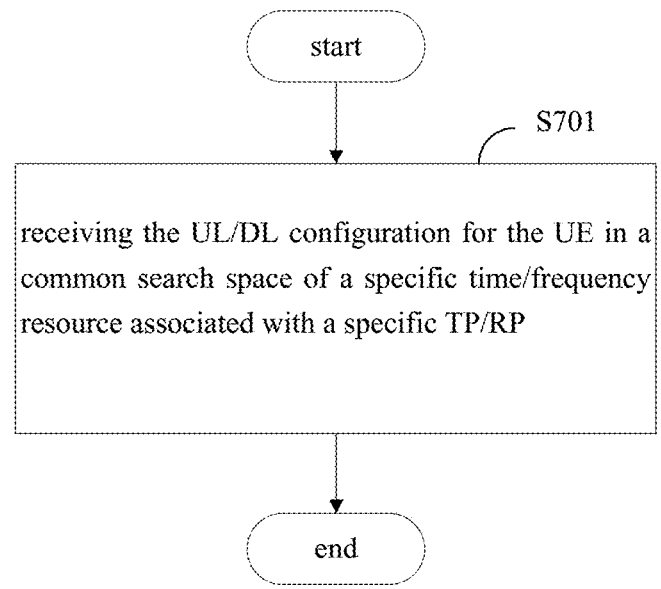
FIG. 7 is a flowchart showing a wireless communication method by a user equipment according to the third embodiment of the present disclosure.

FIG. 6 is a diagram showing a wireless communication method by a base station according to an implementation of the third embodiment. FIG. 7 is a diagram showing a wireless communication method by a UE according to another implementation of the third embodiment. Similar to the scenario in the first embodiment, the wireless communication method is also applied in a wireless communication system including multiple TP/RPs.

At the (macro) base station side, in the wireless communication method according to the third embodiment, as shown in FIG. 6, the method comprises a step 601 of transmitting the UL/DL configuration to a UE attached to a specific TP/RP, in a common search space (CSS) of a specific time/frequency resource associated with the specific TP/RP.

In addition, although it is not shown in FIG. 6, at the TP/RP side, similarly, the method comprises a step of transmitting the UL/DL configuration to a user equipment (UE) attached to the TP/RP itself, in a common search space of a specific time/frequency resource associated with the TP/RP.

In particular, the (macro) base station and the TP/RPs in the wireless communication system transmit (e.g. broadcast) UL/DL configuration, in the CSS. More particularly, they transmit the UL/DL configuration for UEs attached to a first TP/RP in a CSS of a first time/frequency resource, transmit the UL/DL configuration for UEs attached to a second TP/RP in a CSS of a second time/frequency resource, and so on. In other words, for each TP/RP, a specific time/frequency resource associated with the TP/RP is assigned for its own UL/DL configuration transmission. The association between the number index of the TP/RP and an index of the specific time/frequency resource may be hard coded in advance, for example. Alternatively, the association may be configured by a high layer signaling, such as a Radio Resource Control (RRC) signaling or a broadcast signaling (e.g., System Information Block (SIB)).

The number index of the TP/RP (also referred to as the TP/RP number hereinafter) may be configured by a high layer signaling. For example, the TP/RP number may be configured by a UE-specific Radio Resource Control (RRC) signaling. Further, the TP/RP number may be only useful to receive the UL/DL configuration by the UE, and may not necessarily be used to identify the TP/RP in the CoMP operations, so that there is no impact on the current CoMP.

At the UE side, in the wireless communication method according to the third embodiment, as shown in FIG. 7, the method comprises a step 701 of receiving the UL/DL configuration for the UE, in a common search space of a specific time/frequency resource associated with a specific TP/RP; wherein the UE is attached to the specific TP/RP, and the association between a number index of the specific TP/RP and an index of the specific time/frequency resource is predefined.

In particular, the UE may receive the UL/DL configuration for UEs in the specific TP/RP from the specific TP/RP and/or from the (macro) base station in a common search space of the specific time/frequency resource, since the specific TP/RP and the (macro) base station broadcast the same UL/DL configuration in the same CSS.

The index of the specific time/frequency resource may comprise at least one of a subframe number, a Physical Resource Block (PRB) index, a Control Channel Element (CCE) index, a Enhanced Physical Downlink Control Channel (EPDCCH) set index and a UE Cell Radio Network Temporary Identifier (C-RNTI).

In an example, the association may be an association between the TP/RP number and the subframe number indicating the specific subframe which is assigned for the UL/DL configuration transmission, for example in a TDD based wireless communication system.

In particular, the association may be based on mod(TP/RP number, X), wherein, TP/RP number is the number index of the TP/RP, and X is the number of subframes available for UL/DL configuration transmission, for example equal to 4. The value of X may be configured by the TP/RP according to the traffic type etc, as known to those skilled in the art. Such association may be hard coded in standard, or may be indicated by a high layer signaling, as described above.

It is to be noted that, the above association of mod(TP/RP number, X) is only an example, and those skilled in the art may design the association based on other expressions, on the basis of the above teaching, which will also be fallen within the scope of the present disclosure.

In another example, the association may be an association between the TP/RP number and the PRB or CCE index indicating the specific PRB or CCE which is assigned for the UL/DL configuration transmission. Alternatively, the association may be an association between the TP/RP number and the (e)PDCCH set index indicating the specific (e)PDCCH set which is assigned for the UL/DL configuration transmission.

In a further example, the association may be an association between the TP/RP number and the UE ID (C-RNTI). For example, when there are a small number of UEs in a TDD based wireless communication system, the UE attached to a specific TP/RP may determine the specific subframe based on the mod (C-RNTI, X), wherein, C-RNTI is the identifier of the UE, and X is the number of subframes available for UL/DL configuration transmission.

Figure 8:
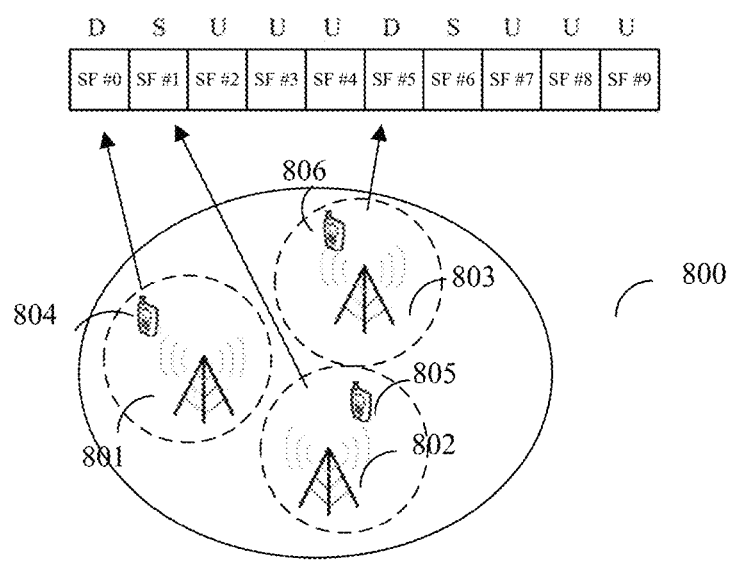
FIG. 8 is a schematic diagram showing the association between TP/RP number and subframe number in a TDD based wireless communication system.

FIG. 8 is a schematic diagram showing the association between the TP/RP number and the subframe number in a TDD based wireless communication system. In FIG. 8, the upper part is a row indicating the UL/DL configuration 1 as shown in Table 1. The lower part is a schematic CoMP scenario 800 comprising three TP/RPs 801-803, wherein, a UE 804 is attached to the TP/RP 801, a UE 805 is attached to the TP/RP 802, and a UE 806 is attached to the TP/RP 806. It is to be noted that the macro base station is not shown in this figure for clearly illustrating the embedment of the present disclosure. According to the third embodiment, the UE 804 only expect to receive its own TDD UL/DL configuration in subframe #0, the UE 805 only expect to receive its own TDD UL/DL configuration in subframe #1, and the UE 806 only expect to receive its own TDD UL/DL configuration in subframe #5.

Of course, the above kinds of association are only examples, and the present disclosure is not limited thereto. In addition, the above kinds of association may be combined with each other when appropriate, especially when there is a large number of TP/RPs.

For example, the following Table 2 is an example of the association between the TP/RP number and the subframe number in a TDD based wireless communication system including 12 TP/RPs. Assuming there are 4 subframes available for UL/DL configuration transmission in total. Since the number of TP/RPs is larger than the available subframes, the TP/RPs needs to be grouped into groups as described in the second and the fourth embodiment, so that more than one (in this example, 3) TP/RPs correspond to the same subframe. Therefore, for each TP/RP in a certain group, another index may be necessary to further indicate the specific time/frequency resource associated with the TP/RP.

TABLE 2

| subframe dependent configuration of (group) CSS | | | | |
|---|---|---|---|---|
| | Subframe #0 | Subframe #1 | Subframe #5 | Subframe #6 |
| TP/RP index expecting to receive (group) CSS | 1, 2, 3 | 4, 5, 6 | 7, 8, 9 | 10, 11, 12 |

In this case, in addition to the subframe number, another index indicating the frequency position in frequency domain, for example the CCE index or the PRB index, may be used. The CCE index or the PRB index may be an index indicating the starting position of the CSS for the UL/DL configuration transmission. Therefore, not only the specific subframe assigned for TP/RP may be determined, but also specific CCE(s) or specific PRB(s) in the specific subframe may be determined.

Alternatively, in addition to the subframe number, similar to that in the first embodiment, an identifier for identifying the UL/DL configuration for the UE attached to the specific TP/RP may be used in this case. The identifier may be formed of bits in Downlink Control Information (DCI), as described in the first embodiment. However, compared to the identifier in the first embodiment, the number of bits of the identifier is considerably reduced. For example, in the case of Table 2, since there are totally 12 TP/RPs, the identifier needs to identify 7^12=13841287201 kinds of UL/DL configuration possibilities according to the first embodiment. However, according to the third embodiment, since TP/RPs in different groups transmit UL/DL configuration in different subframes, the identifier only needs to identify the UL/DL configuration for TP/RPs in the same group, i.e., 3 TP/RPs in this case. In other words, the identifier needs to identify 7^3=343 kinds of UL/DL configuration possibilities. Of course, the number of bits of the identifier can be largely reduced.

In other implementations of the third embodiment, a UE of receiving UL/DL configuration, and a TP/RP of transmitting UL/DL configuration are provided. The UE and the TP/RP are also applied in the wireless communication system includes multiple TP/RPs.

Figure 9:
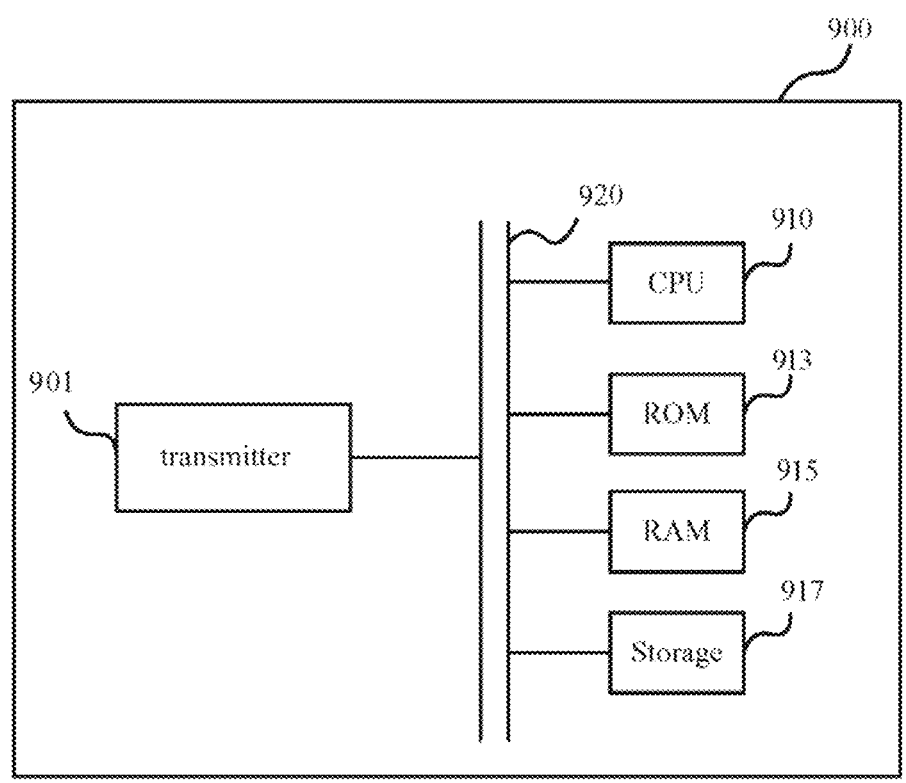
FIG. 9 is a block diagram showing a schematic structure of a transmission/reception point according to the third embodiment of the present disclosure.

FIG. 9 is a block diagram showing the schematic structure of a base station 900 according to the third embodiment of the present disclosure. As shown in FIG. 9, the base station 900 comprises a transmitter 901 which transmits the UL/DL configuration to a UE, in a common search space of a specific time/frequency resource associated with a specific TP/RP, wherein, the UE is attached to the specific TP/RP, and the association between number index of the specific TP/RP and an index of the specific time/frequency resource is predefined.

The base station 900 according to the third embodiment may optionally include a CPU (Central Processing Unit) 910 for executing related programs to process various data and control operations of respective units in the TP/RP 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 917 for storing various programs, data and so on. The above transmitter 901, CPU 910, ROM 913, RAM 915 and/or storage unit 917 etc. may be interconnected via data and/or command bus 920 and transfer signals between one another.

Respective units as described above do not limit the scope of the present disclosure. According to one implementation of the disclosure, the functions of the above transmitter 901 may be implemented by hardware, and the above CPU 910, ROM 913, RAM 915 and/or storage unit 917 may not be necessary. Alternatively, the functions of the above transmitter 901 may also be implemented by functional software in combination with the above CPU 910, ROM 913, RAM 915 and/or storage unit 917 etc.

Also, although it is not shown, the TP/RP according to the third embodiment has a similar structure to the (macro) base station 900 in FIG. 9. That is, the TP/RP comprises a transmitter which transmits the UL/DL configuration to a user equipment (UE), in a common search space of a specific time/frequency resource associated with the TP/RP, wherein, the UE is attached to the TP/RP, and the association between number index of the TP/RP and an index of the specific time/frequency resource is predefined.

Figure 10:
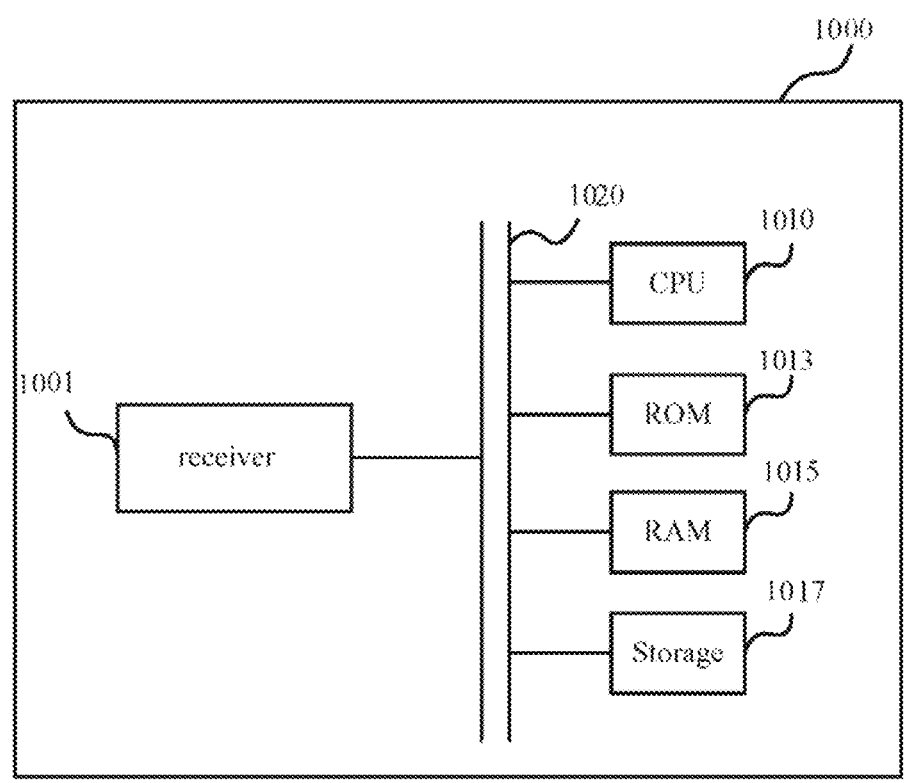
FIG. 10 is a block diagram showing a schematic structure of a user equipment according to the third embodiment of the present disclosure.

FIG. 10 is a diagram showing a schematic structure of a UE 1000 according to the third embodiment of the present disclosure. As shown in FIG. 10, the UE 1000 comprises a receiver 1001 which receives the UL/DL configuration for the UE in a common search space of a specific time/frequency resource associated with a specific TP/RP, wherein, the UE is attached to the specific TP/RP, and the association between number index of the specific TP/RP, and an index of the specific time/frequency resource is predefined.

The UE 1000 according to the third embodiment may optionally include a CPU (Central Processing Unit) 1010 for executing related programs to process various data and control operations of respective units in the UE 1000, a ROM (Read Only Memory) 1013 for storing various programs required for performing various process and control by the CPU 1010, a RAM (Random Access Memory) 1015 for storing intermediate data temporarily produced in the procedure of process and control by the CPU 1010, and/or a storage unit 1017 for storing various programs, data and so on. The above receiver 1001, CPU 1010, ROM 1013, RAM 1015 and/or storage unit 1017 etc. may be interconnected via data and/or command bus 1020 and transfer signals between one another.

Respective units as described above do not limit the scope of the present disclosure. According to one implementation of the disclosure, the functions of the above receiver 1001 may be implemented by hardware, and the above CPU 1010, ROM 1013, RAM 1015 and/or storage unit 1017 may not be necessary. Alternatively, the functions of the above receiver 1001 may also be implemented by functional software in combination with the above CPU 1010, ROM 1013, RAM 1015 and/or storage unit 1017 etc.

Accordingly, in another implementation, a wireless communication system is provided, comprising: a first transmission/reception point (TP/RP), which transmits a first uplink/downlink (UL/DL) configuration to user equipments (UEs) in its coverage in a common search space of a first time/frequency resource associated with the first TP/RP; a second TP/RP, which transmits a second UL/DL configuration to UEs in its coverage in a common search space of a second time/frequency resource associated with the second TP/RP; a base station which transmits the first uplink/downlink UL/DL configuration to UEs in its coverage in the common search space of the first time/frequency resource, and transmits the second UL/DL configuration to UEs in its coverage in the common search space of the second time/frequency resource; a first UE attached to the first TP/RP, which receives the first UL/DL configuration in the common search space of the first time/frequency resource; and a second UE attached to the second TP/RP, which receives the second UL/DL configuration in the common search space of the second time/frequency resource; wherein, the association between a number index of TP/RP and an index of time/frequency resource is predefined at the base station, the first TP/RP, the second TP/RP, the first UE and the second UE.

According to the above implementations of the third embodiment, the UL/DL configuration transmission is dependent on the time/frequency resource unit. For example, in a TDD based communication system, the UL/DL configuration transmission is subframe-dependent. Therefore, even when there are multiple TP/RPs sharing the same CSS in the CoMP scenario, each TP/RP can have its own UL/DL configuration so as to adapt to its own UL/DL traffic.

Further, according to the third embodiment of the present disclosure, there is potentially no need to add bits to the existing CSS based DCI or reuse some bits in the DCI for identifying the UL/DL configuration, especially when there is a relatively small number of TP/RPs in the system. Therefore, there is less standardization effort.

In addition, since UL/DL configuration for different TP/RPs is transmitted in different time/frequency resources, there is a splitting gain in the corresponding time/frequency domain.

In the above implementations of the third embodiment, the UL/DL configuration is transmitted in CSS. Alternatively, in other implementations as described hereinafter, the UL/DL configuration may also be transmitted in UE-specific search space (USS).

In this implementation, at the UE side, the method comprises a step of: receiving the UL/DL configuration for the UE from a specific TP/RP, in a UE specific search space of a specific time/frequency resource associated with the specific TP/RP, wherein, the UE is attached to the specific TP/RP, and the association between a number index of the specific TP/RP and an index of the specific time/frequency resource is predefined.

At the TP/RP side, the method comprises a step of: transmitting UL/DL configuration to a UE attached to the TP/RP, in a UE specific search space of a specific time/frequency resource associated with the TP/RP; wherein, the association between a number index of the TP/RP and an index of the specific time/frequency resource is predefined.

In particular, in this implementation, the (macro) base station does not transmit UL/DL configuration, while each TP/RP transmits its own TP/RP in a USS of a time/frequency resource associated with the TP/RP itself. The association is similar to those described in the above implementation, and will not be described here in detail.

Accordingly, in this implementation, a UE is provided, comprising: a receiver which receives the UL/DL configuration for the UE from a specific TP/RP, in a UE specific search space of a specific time/frequency resource associated with the specific TP/RP, wherein, the UE is attached to the specific TP/RP, and the association between a number index of the specific TP/RP and an index of the specific time/frequency resource is predefined.

Also, a TP/RP is provided, comprising: a transmitter which transmits UL/DL configuration to a UE attached to the TP/RP, in a UE specific search space of a specific time/frequency resource associated with the TP/RP; wherein, the association between a number index of the TP/RP and an index of the specific time/frequency resource is predefined.

Also, a wireless communication system is provided, comprising: a base station; a first TP/RP which transmits a first UL/DL configuration to UEs in its coverage, in a UE specific common search space of a first time/frequency resource; a second TP/RP which transmits a second UL/DL configuration to UEs in its coverage, in a UE specific common search space of a second time/frequency resource; a first UE attached to the first TP/RP, which receives the first UL/DL configuration from the first TP/RP, in the UE specific common search space of the first time/frequency resource; and a second UE attached to the second TP/RP, which receives the second UL/DL configuration from the second TP/RP, in the UE specific common search space of the second time/frequency resource; wherein, the association between a number index of TP/RP and an index of time/frequency resource is predefined at the first TP/RP, the second TP/RP, the first UE and the second UE.

The structures of the TP/RP and the UE in this implementation are similar to those in the above implementation described with reference to FIGS. 9 and 10, and will not be described here in detail.

According to this implementation, even when there are multiple TP/RPs in the CoMP scenario, each TP/RP can transmit its own UL/DL configuration to the attached UEs in a USS, so as to adapt to its own UL/DL traffic.

Further, according to this implementation, even for a UE at the edge of a certain TP/RP's coverage or in an overlapped area of multiple TP/RPs' coverage, since different TP/RPs transmit their UL/DL configuration in different time/frequency resources, it can correctly receive the UL/DL configuration from the specific TP/RP to which it is attached, thereby reducing the false detection and the interference caused by other TP/RPs.

Fourth Embodiment

Figure 11:
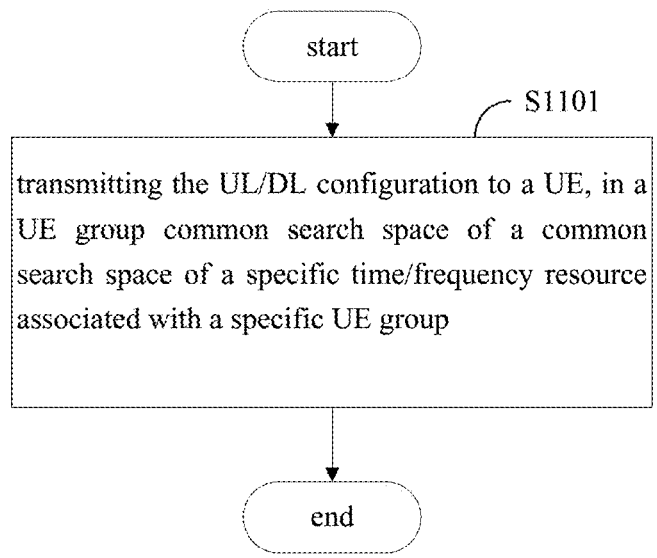
FIG. 11 is a flowchart showing a wireless communication method by a transmission/reception point according to a fourth embodiment of the present disclosure.
Figure 12:
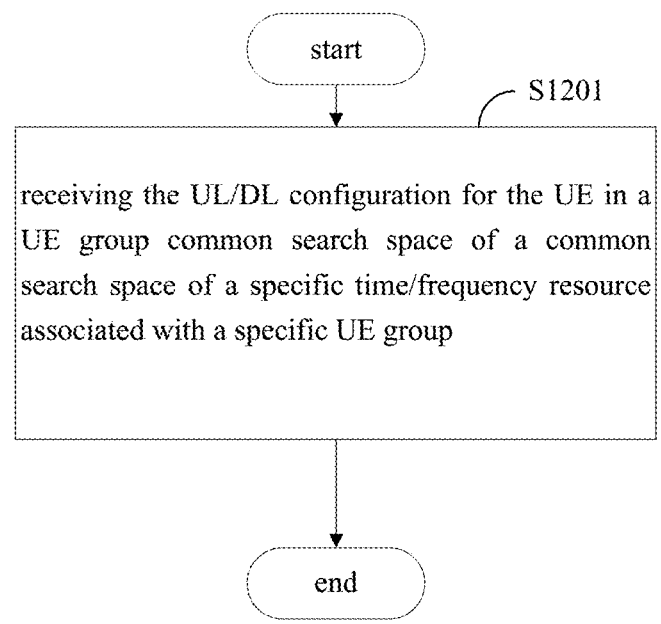
FIG. 12 is a flowchart showing a wireless communication method by a user equipment according to the fourth embodiment of the present disclosure.

FIG. 11 is a diagram showing a wireless communication method by a base station according to an implementation of the fourth embodiment. FIG. 12 is a diagram showing a wireless communication method by a UE according to another implementation of the fourth embodiment. Similar to the scenario in the first embodiment, the wireless communication method is also applied in a wireless communication system including multiple TP/RPs.

At the (macro) base station side, as shown in FIG. 11, the method comprises a step 1101 of: transmitting the UL/DL configuration to a UE, in a UE group common search space of a CSS of a specific time/frequency resource associated with a specific UE group, wherein, the UE is grouped into the specific UE group, and the association between number index of the specific UE group and an index of the specific time/frequency resource is predefined.

Also, although it is not shown in FIG. 11, similarly, at the TP/RP side, the method comprises a step of: transmitting the UL/DL configuration to a UE, in a UE group common search space of a common search space of a specific time/frequency resource associated with a specific UE group, wherein, the UE is grouped into the specific UE group, and the association between number index of the specific UE group and an index of the specific time/frequency resource is predefined.

At the UE side, as shown in FIG. 12, the method comprises a step 1201 of: receiving the UL/DL configuration for the UE in a UE group common search space of the CSS of a specific time/frequency resource associated with a specific UE group, wherein, the UE is grouped into the specific UE group, and the association between number index of the specific UE group, and an index of the specific time/frequency resource is predefined.

The meaning of UE group CSS and related detailed process have been described in the second embodiment, and will not be described here to avoid redundancy. Different from those in the second embodiment, in the fourth embodiment, the TP/RP transmits the UL/DL configuration in the specific time/frequency resource as described above in the third embodiment. The specific time/frequency resource is associated with a specific UE group. Thereby, a UE in the specific group may only receive its UL/DL configuration in the specific time/frequency resource.

Similar to those in the third embodiment, the index may comprise at least one of a subframe number, a Physical Resource Block (PRB) index, a Control Channel Element (CCE) index, a Enhanced Physical Downlink Control Channel (EPDCCH) set index and a UE Cell Radio Network Temporary Identifier (C-RNTI). However, different from the association of mod(TP/RP number X) in the third embodiment, in this embodiment, the association may be based on mod(UE group number, X), wherein, UE group number is the number index of the UE group, and X is the number of subframes available for UL/DL configuration transmission, for example equal to 4. Similarly, the UE group number may be configured by a high layer signaling.

In this implementation, the UE group CSS is defined in the CSS shared by the (macro) base station and the TP/RPs. Since UEs in different UE groups receive the UL/DL configuration in different time/frequency resources, different UE groups, which may potentially means different TP/RPs, may still have their own UL/DL configuration, even when they share the same UE group CSS in the CSS.

Alternatively, in another implementation, the UE group CSS may be defined in the USS. In this implementation, as described in the second embodiment, only the TP/RPs transmit their own UL/DL configurations.

In detail, at the TP/RP side, the method comprises a step of: transmitting the UL/DL configuration to a UE attached to the TP/RP, in a UE group common search space of a UE specific search space of a specific time/frequency resource associated with a specific UE group; wherein, the UE is grouped into the specific UE group, and the association between a number index of the specific UE group and an index of the specific time/frequency resource is predefined.

At the UE side, the method comprises a step of: receiving the UL/DL configuration for the UE from a TP/RP to which it is attached, in a UE group common search space of a UE specific search space of a specific time/frequency resource associated with a specific UE group, wherein, the UE is grouped into the specific UE group, and the association between a number index of the specific UE group and an index of the specific time/frequency resource is predefined.

In this implementation, different TP/RPs may transmit their own TP/RP configuration in the USS. Moreover, since different TP/RPs transmit their own TP/RP configuration in different time/frequency resource, even for a UE at the edge of a certain TP/RP's coverage or in an overlapped area of multiple TP/RPs' coverage, it can correctly receive the UL/DL configuration from the specific TP/RP to which it is attached, thereby reducing the false detection and the interference caused by other TP/RPs.

Figure 13:
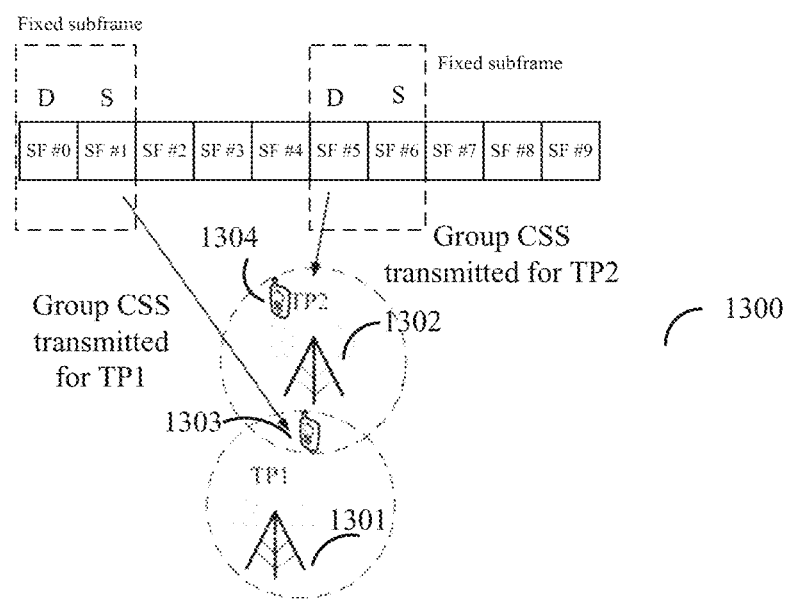
FIG. 13 is a schematic diagram showing the association between UE group number and subframe number in a TDD based wireless communication system.

For example, FIG. 13 is a schematic diagram showing the association between the UE group number and the subframe number in a TDD based wireless communication system. In FIG. 13, the upper part is a row indicating a UL/DL configuration. The lower part is a schematic wireless communication system 1300 comprising two TP/RPs 1301 and 1302. Also, assuming that UEs attached to the same TP/RP forms a UE group, then UEs of the UE group in the TP/RP 1301 (e.g., UE 1303) may only expect to receive the UL/DL configuration in subframe #0 and subframe #1, and UEs of the UE group in the TP/RP 1302 (e.g., UE 1304) may only expect to receive the UL/DL configuration in subframe #5 and subframe #6. Thereby, different UE group, which potentially means different TP/RPs, may have their own UL/DL configuration, no matter the UE-group CSS is defined in CSS or the USS.

Further, assuming that the UL/DL configuration is transmitted in a UE group CSS in the USS. Then, even for a UE at the edge of a certain TP/RP's coverage or in an overlapped area of multiple TP/RPs' coverage, for example UE 1303, it may only expect to receive the UL/DL configuration in subframe #0 and subframe #1 since it belongs to the UE group attached to the TP/RP 1301. Thereby, the false detection by the UE and the interference with other TP/RPs are reduced.

The base station or the TP/RP according to an implementation of the fourth embodiment which comprises a transmitter may have a similar configuration as the base station 900 or the TP/RP according to the third embodiment except the following. The transmitter according to this implementation of the fourth embodiment may transmit the UL/DL configuration to a UE, in a UE group common search space of a CSS of a specific time/frequency resource associated with a specific UE group; wherein, the UE is grouped into the specific UE group, and the association between a number index of the specific UE group and an index of the specific time/frequency resource is predefined.

Accordingly, the UE according to an implementation of the fourth embodiment which comprises a receiver may have a similar configuration as the UE 1000 according to the third embodiment except the following. The receiver according to this implementation of the fourth embodiment may receive the UL/DL configuration for the UE, in a UE group common search space of a CSS of a specific time/frequency resource associated with a specific UE group, wherein, the UE is grouped into the specific UE group, and the association between a number index of the specific UE group and an index of the specific time/frequency resource is predefined.

Accordingly, the wireless communication system according to an implementation of the fourth embodiment comprises: a first TP/RP, which transmits a first UL/DL configuration to UEs in its coverage, in a UE group common search space of a common search space of a first time/frequency resource associated with a first UE group; a second TP/RP, which transmits a second UL/DL configuration to UEs in its coverage, in a UE group common search space of a common search space of a second time/frequency resource associated with a second UE group; a base station which transmits the first UL/DL configuration to UEs in its coverage in the UE group common search space of the common search space of the first time/frequency resource, and transmits a second UL/DL configuration to UEs in its coverage in the UE common group search space of the common search space of the second time/frequency resource; a first UE in the first UE group, which receives the first UL/DL configuration, in the UE group common search space of the common search space of the first time/frequency resource; and a second UE in the second UE group, which receives the second UL/DL configuration, in the UE group common search space of the common search space of the second time/frequency resource; wherein, the association between a number index of UE group and an index of time/frequency resource is predefined at the base station, the first TP/RP, the second TP/RP, the first UE and the second UE.

Also, according to another implementation of the present disclosure, the TP/RP which comprises a transmitter may have a similar configuration as the TP/RP according to the third embodiment except the following. The transmitter according to this implementation of the fourth embodiment may transmit the UL/DL configuration to a UE attached to the TP/RP, in a UE group common search space of a UE specific search space of a specific time/frequency resource associated with a specific UE group; wherein, the UE is grouped into the specific UE group, and the association between a number index of the specific UE group and an index of the specific time/frequency resource is predefined.

Accordingly, the UE according to an implementation of the fourth embodiment which comprises a receiver may have a similar configuration as the UE 1000 according to the third embodiment except the following. The receiver according to this implementation of the fourth embodiment may receive the UL/DL configuration for the UE from a TP/RP to which it is attached, in a UE group common search space of a UE specific search space of a specific time/frequency resource associated with a specific UE group, wherein, the UE is grouped into the specific UE group, and the association between a number index of the specific UE group and an index of the specific time/frequency resource is predefined.

Accordingly, the wireless communication system according to this implementation of the fourth embodiment comprises: a base station; a first TP/RP, which transmits a first UL/DL configuration to UEs in its coverage, in a UE group common search space of a UE specific search space of a first time/frequency resource associated with a first UE group; a second TP/RP which transmits a second UL/DL configuration to UEs in its coverage, in a UE group common search space of a UE specific search space of a second time/frequency resource associated with a second UE group; a first UE in the first UE group, which receives the first UL/DL configuration from the first TP/RP, in the UE group common search space of the UE specific search space of the first time/frequency resource; and a second UE in the second UE group, which receives the second UL/DL configuration from the second TP/RP, in the UE group common search space of the UE specific search space of the second time/frequency resource; wherein, the association between a number index of UE group and an index of time/frequency resource is predefined at the first TP/RP, the second TP/RP, the first UE and the second UE.

The other parts and process of the fourth embodiment are similar to those described in the second or third embodiment, and will not be described here to avoid redundancy.

The above embodiments of the present disclosure are only exemplary description, and their specific structures and operations do not limit the scope of the disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the disclosure do not limit the scope of the present disclosure, in which one or multiple functional element(s) or unit(s) may contain or be connected to any other functional elements.

Although several embodiments of the present disclosure has been shown and described in combination with attached drawings above, those skilled in the art should understand that variations and modifications which still fall into the scope of claims and their equivalents of the present disclosure can be made to these embodiments without departing from the principle and spirit of the disclosure.

What is claimed is:

1. A communication apparatus comprising:
a receiver, which, in operation,
receives, in a first set of subframes of a common search space, first uplink/downlink (UL/DL) configuration information relating to a first transmission reception point (TP/RP),
receives, in a second set of subframes of the common search space, second UL/DL configuration information relating to a second TP/RP,
receives, in a third set of subframes of the common search space, third UL/DL configuration information relating to a third TP/RP, and
receives subframe information indicative of the first set of subframes; and
circuitry, which, in operation, decodes the first UL/DL configuration information based on the subframe information,
wherein a set of subframes determined based on a correspondence between the first set of subframes and the first TP/RP is a same set of subframes determined based on a correspondence between the second set of subframes and the second TP/RP, and is different from a set of subframes determined based on a correspondence between the third set of subframes and the third TP/RP.

2. The communication apparatus according to claim 1, wherein the subframe information is transmitted by a higher layer signaling.

3. The communication apparatus according to claim 1, wherein subframes included in the common search space to be monitored by a UE are associated with a group of UEs.

4. The communication apparatus according to claim 1, wherein an UL/DL configuration defines transmission timings of at least one downlink subframe, at least one uplink subframe and at least one special subframe for switching from downlink to uplink.

5. The communication apparatus according to claim 1, wherein a correspondence is based on mod (TP/RP number, a number of available subframes).

6. A communication method comprising:
receiving, in a first set of subframes of a common search space, first uplink/downlink (UL/DL) configuration information relating to a first transmission reception point (TP/RP);
receiving, in a second set of subframes of the common search space, second UL/DL configuration information relating to a second TP/RP;
receiving, in a third set of subframes of the common search space, third UL/DL configuration information relating to a third TP/RP;
receiving subframe information indicative of the first set of subframes; and
decoding the first UL/DL configuration information based on the subframe information,
wherein a set of subframes determined based on a correspondence between the first set of subframes and the first TP/RP is a same set of subframes determined based on a correspondence between the second set of subframes and the second TP/RP, and is different from a set of subframes determined based on a correspondence between the third set of subframes and the third TP/RP.

7. The communication method according to claim 6, wherein the subframe information is transmitted by a higher layer signaling.

8. The communication method according to claim 6, wherein subframes included in the common search space to be monitored by a UE are associated with a group of UEs.

9. The communication method according to claim 6, wherein an UL/DL configuration defines transmission timings of at least one downlink subframe, at least one uplink subframe and at least one special subframe for switching from downlink to uplink.

10. The communication method according to claim 6, wherein a correspondence is based on mod (TP/RP number, a number of available subframes).

* * * * *